United States Patent [19]

Föhl

[11] 4,351,496
[45] Sep. 28, 1982

[54] SAFETY BELT ROLL-UP DEVICE

[75] Inventor: Artur Föhl, Schorndorf-Haubersbronn, Fed. Rep. of Germany

[73] Assignee: Repa Feinstanzwerk GmbH, Alfdorf, Fed. Rep. of Germany

[21] Appl. No.: 169,631

[22] Filed: Jul. 16, 1980

[30] Foreign Application Priority Data

Jul. 31, 1979 [DE] Fed. Rep. of Germany ....... 2931075

[51] Int. Cl.³ ...................... A62B 35/02; B65H 75/48
[52] U.S. Cl. ............................................... 242/107.4 A
[58] Field of Search ................. 242/107.4 A, 107.4 B, 242/107.4 R; 280/801–808; 297/475–480

[56] References Cited

U.S. PATENT DOCUMENTS

| 3,944,162 | 3/1976 | Henderson | 242/107.4 A |
| 3,985,314 | 10/1976 | Booth | 242/107.4 A |
| 4,094,475 | 6/1978 | Takada | 242/107.4 A |
| 4,108,394 | 8/1978 | Oishi et al. | 242/107.4 A |
| 4,162,773 | 7/1979 | Wallin | 242/107.4 A |
| 4,193,566 | 3/1980 | Inukai | 242/107.4 A |
| 4,244,537 | 1/1981 | Labeur | 242/107.4 A |

Primary Examiner—John M. Jillions
Attorney, Agent, or Firm—Herbert L. Lerner; Laurence A. Greenberg

[57] ABSTRACT

Safety belt roll-up device with a locking pawl mechanism to engage locking teeth of a locking wheel in fixed connection with the belt shaft. The pawl mechanism has a double locking pawl having two pawl levers, rotatably mounted on a common pivot axis. Each lever has a pawl tooth for engagement with the locking wheel. The two pawl teeth are spaced a distance which is different than the pitch of the locking teeth of the locking wheel or a multiple thereof. A release mechanism, upon the vehicle exceeding permissible limit of acceleration or deceleration, activates the pawl to move into locking engagement. By virture of the two pawl levers in the locking mechanism combination of the invention, a pawl tooth hitting the point of the tooth of the locking wheel and bouncing off, results in immediate engagement of the other pawl tooth with a locking tooth of the locking wheel.

10 Claims, 3 Drawing Figures

SAFETY BELT ROLL-UP DEVICE

BACKGROUND OF THE INVENTION

1. Field of the Invention

This invention relates to a safety belt roll-up device with a locking pawl mechanism consisting of a locking wheel with locking teeth fixedly connected to the belt shaft and at least one locking pawl which, in case of a crash, is activated by an automatic release mechanism to cause the pawl to engage with the locking teeth.

2. Description of the Prior Art

In known safety belt roll-up devices of the above mentioned type, as for example U.S. Pat. No. 3,901,459, a roll-up spring is arranged at one side of the belt roller, while the opposite shaft end is in connection with a locking pawl arrangement and a release mechanism. In case of danger, i.e at the occurrence of an acceleration or deceleration which exceeds a permissible limit, the release-mechanism which, for example, is provided with an inertial mass in form of a ball, directly or indirectly moves a locking pawl of the locking pawl mechanism against the locking wheel, and causes the engagement of the locking teeth with the locking pawl. The danger exists that a bouncing chatter occurs if the point of the tooth of the locking wheel accidentally meets with, i.e. hits the locking pawl. As a result the locking pawl is moved away from the locking tooth, so that naturally the locking of the locking wheel can not take place, at least not in the danger moment.

SUMMARY OF THE INVENTION

An object of the present invention is to provide a safety belt roll-up device of the above-mentioned type which is of simple construction form and in which such bouncing problems cannot occur.

With the foregoing and other objects in view, there is provided in accordance with the invention, a safety belt roll-up device with a locking pawl mechanism for a vehicle comprising a frame, a rotatable belt shaft on which a belt is wound mounted in the frame, a locking wheel with locking teeth of a defined pitch in fixed connection with the belt shaft, a double locking pawl having two pawl levers with each lever having a pawl tooth for engagement with the locking teeth of the locking wheel, a common pivot axis mounted in the frame, the two pawl levers rotatably mounted on the common pivot axis with one lever extending on one side and the other lever on the other side of the pivot axis along the circumference of the locking wheel, and with pawl teeth of the levers adjacent to but out of engagement with the locking teeth of the locking wheel, the pawl teeth of the two pawl levers spaced a distance which is different than the pitch of the locking teeth of the locking wheel or a multiple thereof, a release mechanism responsive to acceleration or deceleration of the vehicle which exceeds a permissible limit mounted on the frame, engaging means activated by the release mechanism when the permissible limit is exceeded, to move the double locking pawl and cause engagement of the locking pawl with the locking teeth of the locking wheel.

Other features which are considered as characteristic for the invention are set forth in the appended claims.

Although the invention is illustrated and described herein as embodied in a safety belt roll-up device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
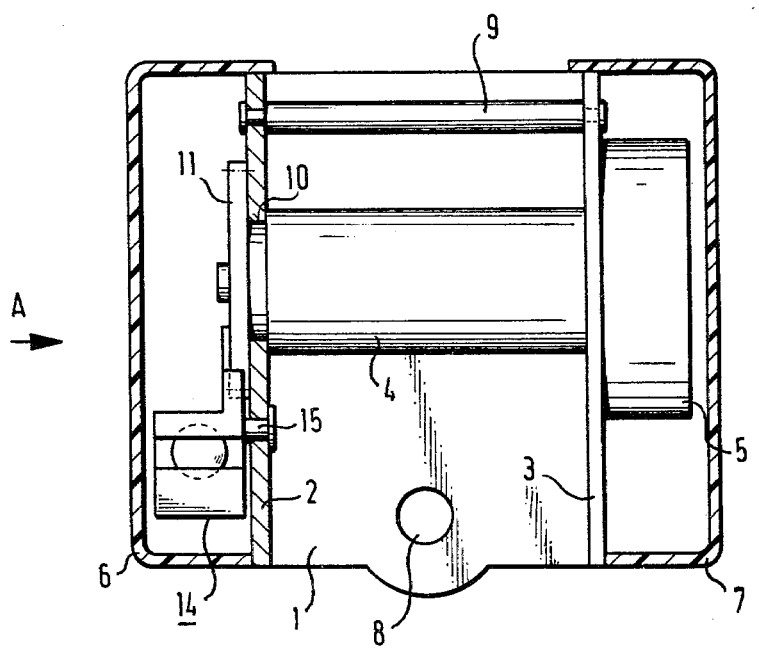
FIG. 1 is a schematic sectional view of the safety belt roll-up device in accordance with the invention, showing the relationship of the belt shaft locking wheel, pivot axis for double locking pawl and release mechanism in form of a ball sensor.

A double pawl has two pawl levers arranged rotatably on a common pivot axis and on both sides of this pivot axis, along the circumference of the locking wheel. The spacing of the pawl teeth of the two pawl levers corresponds to a dimension which is different than the pitch of the locking teeth of the locking wheel, or a multiple thereof. Preferably, the distance of the pawl-teeth from each other corresponds to the $n+\frac{1}{2}$-times the pitch of the locking teeth, where n represents the pitch or a multiple thereof. This assures that in the tooth-on tooth position of one of the pawl levers, the other pawl lever which also is activated by the release mechanism, is in a region between two teeth points of the locking wheel, and can without difficulty get into the lock position. Experiments have shown that a maximum engagement reliability results at an approximately centered arrangement of the hook-like locking element of the last-mentioned locking lever between two immediately adjacent tooth points of the locking wheel.

According to a further development of the invention, the double locking pawl is constructed as a two-armed lever which is hingeable around a pivot axis. According to a preferred embodiment form the release mechanism which is in mechanical connection with a lever arm of the two-armed lever serving as a pawl lever, is preferably constructed as a ball sensor. The ball sensor is hingeably supported on the pivot axis of the lever against the force of a spring, and in the rest position bears against a stop. Now in the case of a crash, if a tooth-on-tooth position exists, so that a bouncing of the double locking pawl occurs, one lever arm is automatically moved against the locking teeth of the locking wheel, i.e. guided into it and engaged, which effects reliable blocking of the locking wheel. The deflection forces or displacing-forces generated at the bounce-impulse are absorbed by the hingeable support of the release mechanism, and assure maintenance of the release position of the release mechanism during the occurrence of the bounce. By this arrangement a mono-sensitive control of automatic safety belt roll-up devices can be achieved.

To keep the double locking pawl, or the locking pawl levers, in the rest position in a predeterined nominal location, according to a further advantageous development of the invention, the center of gravity of the double locking pawl, or the centers of gravity of the locking pawls are positioned eccentrically with respect to the pivot axis, preferably in the immediate vicinity of the pivot axis. Large turning moments at the occurrence of accelerations are avoided by positioning the centers of gravity of the pawls eccentrically with respect to the pivot axis and in the immediate vicinity of the pivot axis.

The invention is further explained with the aid of typical embodiments shown in the drawings.

In FIG. 1, an U-shaped basic frame made of metal is designated by numeral 1, and has side plates 2 and 3. A belt shaft 4 is supported between the side plates 2 and 3, and a flexible belt—not shown—is rolled up on this shaft. A schematically shown roll-up spring 5 is secured to the end of belt shaft 4, which extends beyond the side plate 3, and is fastened at its other side at the basic frame 1. Caps 6 and 7 which may be made of a synthetic material, are push-fitted onto the side plates 2 and 3. The safety belt roll-up device is fastened to the chassis of the motor vehicle by means of a bolt through an opening 8 in the basid frame 1. A spacer rod 9 has both its ends secured to the side plates 2 and 3.

A locking wheel 11 is fixedly connected to one end of the shaft belt 4 extending through the side plate 2 through the opening 10. The locking wheel 11 made of stable material is provided with locking teeth 12 at its circumference, with the tooth tips (points) designated by numeral 13, as is clearly shown in FIGS. 2 and 3. Obviously, the whole circumference of the locking wheel 11 is provided with such teeth. In FIG. 1 a release mechanism in the form of a so-called ball-sensor is designated as a whole with 14. The construction and functioning of this release mechanism will in the following be explained in connection with a locking pawl arrangement with the aid of the two alternative embodiments of FIGS. 2 and 3.

Figure 2:
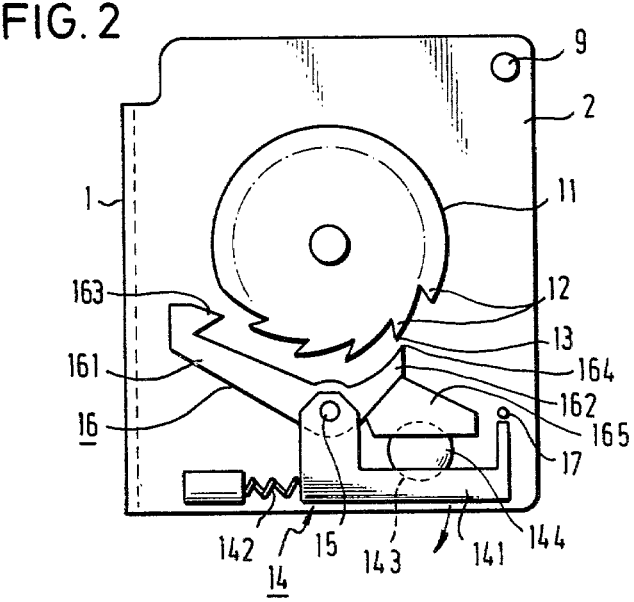
FIG. 2 is a first embodiment form of the safety belt roll-up device according to the invention, in a side view, looking in the direction of the arrow A shown in FIG. 1, and illustrates a double locking pawl in the form of a two-armed lever with the pawl teeth set apart a distance not equal to a multiple of a pitch of the locking teeth of the locking wheel.

In the embodiment of FIG. 2, a double locking pawl 16 is hingeably supported on a pivot axis 15 formed by a suitable shaft. The double-locking-pawl 16 is constructed in the form of a two-armed lever, which has a first lever arm 161 which serves as pawl-lever, and a second arm 162 which also represents a pawl-lever. Both lever arms 16 and 162 have pawl-teeth 163 and 164. The spacing between pawl tooth 163 and pawl tooth 164 with both teeth being equidistant from the belt-axis, is chosen so that it corresponds to a $n+\frac{1}{2}$-times the pitch (division measure) of the locking teeth 12 in which n is equal to the pitch or a multiple thereof. The release mechanism 14 is hingeably supported on the pivot axis 15, independent of the double locking pawl 16. The release mechanism 14 is formed by a base part 141 which is supported on the pivot axis 15, and pressed by a preloaded spring 142 against a fixed stop 17. This base part which is constructed as a one-armed lever contains a recess 143 in which a ball-mass 144 is loosely contained. On the opposing spherical surface of the ball-mass 144 rests a projection 165 of the double locking pawl 16 which is also provided with a recess into which the surface of the ball fits. The projection 165 is in a fixed connection with the lever arm 162 of the double locking pawl 16. In the case of a crash, i.e. at the occurrence of high negative or positive acceleration forces in the vehicle, the ball mass 144 moves out of the recesses of the base part 141 and the projection 165. As a result the lever arm 165 is displaced toward the locking wheel 11 with respect to the base part 141 which is at first held in a stable position by the spring 142. The pawl-tooth 164 of the lever arm 162 engages with a locking tooth 12, and thereby locks the belt shaft 4 instantaneously.

Now if the locking tooth 164 accidentally hits the tooth-top 13 of the locking wheel 11, a bouncing action results, i.e. the lever arm 162 is thrown away from the locking wheel 11, and can therefore not get into the lock-position. But by this bouncing impulse the lever arm 161 which is arranged at the other side of the pivot axis 15 is moved toward the locking wheel 11. As a consequence, the pawl tooth 163 engages a locking tooth 12, and thereby locks the belt shaft 4. A chatter is not possible here, because this pawl tooth 163 is approximately in the middle between two immediate adjacent tooth-points 13. With the bouncing of the double locking pawl 16, the release mechanism 14 and its base part 141 are also tilted, whereby the deflection forces or displacing forces generated by the bounce are absorbed by the release mechanism, and the release position of the release mechanism 14 is maintained during the occurrence of the bounce. After the crash condition is ended, the ball-mass 144 falls back into the recesses again, and the double locking pawl 16 and the release mechanism 14 again assume their rest positions as shown in FIG. 2. As seen in FIG. 1, the pivot shaft which represents the pivot-axis 15 is in a fixed connection with the side plate 2 of the basic frame 1.

Figure 3:
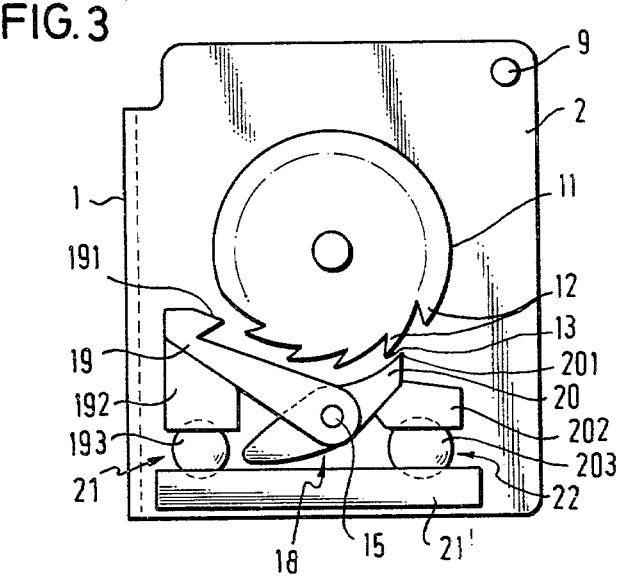
FIG. 3 is a second embodiment form of the safety belt roll-up device in a side view, in which the double locking pawl has two separate pawl levers on a common pivot axis, and each lever has an individual release mechanism.

In the embodiment according to FIG. 3, the double-locking pawl 18 consists of two separate pawl levers 19 and 20, which are hingeable around a common pivot axis 15, and are constructed as one-armed or two-armed levers. The arrangement of the pawl-teeth 191 and 201 with respect to the locking teeth 12 of the locking-wheel 11 is chosen in a manner similar to that in the embodiment according to FIG. 2. A base part 21' is rigidly connected to the side part 2 of the base-frame 1. The base part 21' comprises two release mechanisms 21 and 22 which are also designed in the form of ball-sensors. However, in this embodiment there is associated with each lever arm 19 and 20 an individual release mechanism 21 and 22 respectively. For this purpose the lever arms 19 and 20 are provided with projections 192 and 202 which have corresponding recesses for each ball-mass 193 and 203 respectively.

These ball masses are contained in corresponding recesses of the base part 21'. In case of a crash, both ball masses 193 and 203 move, causing the pawl levers 19 and 20 to move toward the locking wheel 11. Normally, the pawl tooth 201 of the pawl lever 20 engages thereby with a locking tooth 12. However, if there should be a tooth-on-tooth position of pawl tooth 201 and tooth point 13, in conjunction with a bounce of the pawl lever 20, then the pawl tooth 191 of the pawl lever 19 engages with the locking teeth 12 because this pawl lever 19 is in the locking position.

In both embodiments, it is advantageous, if the centers of gravity of the pawl levers 19 and 20 are disposed eccentrically with respect to the pivot axis 15, preferably in the immmediate vicinity of this pivot axis, so that, on the one hand, a defined, predetermined nominal rest position of the pawl levers is assured, and on the other hand no large turning moments are generated in the case of a crash. Thus, for example, the projections 165, 192 and 202 may be made in the form of relative heavy masses.

I claim:

1. Safety belt roll-up device with a locking pawl mechanism for a vehicle comprising a frame, a rotatable belt shaft on which a belt is wound mounted in the frame, a locking wheel with locking teeth of a defined pitch in fixed connection with said belt shaft, a double locking pawl having two lever arms with each lever arm having a pawl tooth for engagement with the locking teeth of said locking wheel, a common pivot axis mounted in the frame, said two lever arms rotatably mounted on said common pivot axis with one lever arm extending on one side and the other lever arm on the other side of the pivot axis along the circumference of the locking wheel, and with pawl teeth of said two lever arms adjacent to but out of engagement with said locking teeth of said locking wheel, said pawl teeth of the two lever arms spaced a distance which is different than the pitch of the locking teeth of the locking wheel or a multiple thereof, a release mechanism responsive to acceleration or deceleration of the vehicle which exceeds a permissible limit mounted on the frame, engaging means activated by said release mechanism when said permissible limit is exceeded to move said double locking pawl and cause engagement of the locking pawl with the locking teeth of the locking wheel.

2. Safety belt roll-up device according to claim 1, wherein the distance of the pawl teeth from each other corresponds to a value equal to a multiple of the pitch plus ½ of the pitch of the locking teeth of the locking wheel.

3. Safety belt roll-up device according to claim 1 wherein the double locking pawl is in the form of a single two-armed lever.

4. Safety belt roll-up device according to claim 2 wherein the double locking pawl is in the form of a single two-armed lever.

5. Safety belt roll-up device according to claim 3, wherein said engaging means is a projection arm extending from said double locking paw, and wherein said release mechanism is constructed as a ball sensor with the ball in mechanical connection with said projection arm of the two-armed lever, and wherein said release mechanism includes an adjacently disposed spring, said release mechanism hingeably supported on said pivot axis against the force of said spring, and in the rest position bears against a stop.

6. Safety belt roll-up device according to claim 4, wherein said engaging means is a projection arm extending from said double locking pawl, and wherein said release mechanism is constructed as a ball sensor with the ball in mechanical connection with said projection arm of the two-armed lever, and wherein said release mechanism includes an adjacently disposed spring, said release mechanism hingeably supported on said pivot axis against the force of said spring, and in the rest position bears against a stop.

7. Safety belt roll-up device according to claim 1, wherein the double locking pawl is formed of two separate lever arms which are rotatable around said common pivot axis and wherein an individual release mechanism is associated with each said lever arm.

8. Safety belt roll-up device according to claim 2, wherein the double locking pawl is formed of two separate lever arms which are rotatable around said common pivot axis and wherein an individual release mechanism is associated with each said lever arm.

9. Safety belt roll-up device according to claim 7 or claim 8, wherein said release mechanism is in the form of a ball sensor.

10. Safety belt roll-up device according to claim 1 or claim 2 or claim 3 or claim 7, wherein said double locking pawl has its center of gravity located eccentrically with respect to the pivot axis.

* * * * *